United States Patent

Spencer

[15] 3,704,769
[45] Dec. 5, 1972

[54] ONE-WAY TIME DELAY ELECTROMAGNETIC CLUTCH

[72] Inventor: Glenn S. Spencer, Horseheads, N.Y.
[73] Assignee: The Bendix Corporation
[22] Filed: Sept. 21, 1971
[21] Appl. No.: 182,338

[52] U.S. Cl. ................192/52, 192/84 R, 192/84 A, 192/84 AB, 188/164
[51] Int. Cl. ............................................F16d 27/06
[58] Field of Search ........192/52, 84 R, 84 A, 84 AB; 188/161, 164

[56] References Cited

UNITED STATES PATENTS

| | | | |
|---|---|---|---|
| 727,641 | 5/1903 | Knowlton | 192/84 AB |
| 727,689 | 5/1903 | Reist | 192/84 AB |
| 786,413 | 4/1905 | Cutler | 192/84 AB |
| 859,523 | 7/1907 | Rowell | 192/84 AB |
| 1,671,057 | 5/1928 | Brainard | 192/84 R |

*Primary Examiner*—Allen D. Herrmann
*Attorney*—Bruce A. Yungman

[57] ABSTRACT

An electromagnetic clutch or brake including means for retarding or slowing the engagement or release of the armature is shown herein. An additional coil comprising one or more turns of high current capacity wire and at least one diode in series circuit relationship therewith is included within the magnet body forming an electromagnetic coupling with the main coil in order to impede the generation or collapse of the main coil-induced electromagnetic field. Control means connected in series circuit relationship with the additional coil comprising at least one diode and a switch and located externally of the clutch may also be included so that application of the one-way magnetically retarding coil and diode means can be selective.

11 Claims, 4 Drawing Figures

PATENTED DEC 5 1972 3,704,769

ONE-WAY TIME DELAY ELECTROMAGNETIC CLUTCH

CROSS REFERENCE TO RELATED APPLICATIONS

This case is related to my commonly assigned copending patent applications Ser. Nos. 182,337 and 182,339 filed on even date.

FIELD OF THE INVENTION

This invention relates generally to a d.c. time delay electromagnetic relay, and more particularly to an electromagnetic coupling operatively associated with an electromagnetic clutch.

BRIEF DESCRIPTION OF THE PRIOR ART

When an electromagnetic clutch is energized, the change in magnetic flux level, from zero to nominal operating level, causes a voltage to be induced in any nearby metal. In the iron of the clutch magnet body and armature plate, this results in a large eddy current which follows a circular path, opposite and parallel to the coil current and perpendicular to the flux. The magnetomotive force created by this eddy current opposes that of the main coil current and results in slowing the rate at which the magnetism rises. When the clutch is deenergized, the falling flux again generates a large eddy current, this time flowing in the opposite direction, (i.e., in the same direction as the coil current) producing a magnetomotive force which aids the main field and delays its collapse. The slow magnetic response that such induced currents cause, both at energization and at deenergization of the coil is generally undesirable. Commonly assigned U.S. Pat. 3,327,822 covers a clutch in which an interruption in the iron ring of magnet body and armature eliminates the eddy current and speeds the magnetic response.

Rapid response, however, is now always a desirable feature. In single surface clutches of the dry friction type, for example, a slow application of torque is generally preferable because of the "soft clutching" and "feathering in" resulting therefrom. This is particularly true where a clutch has been sized to the stall torque of the prime mover. Such a clutch could deliver excessive shock torques in normal day to day service, causing abnormal wear to the clutch faces and possible breakage of associated drive members.

SUMMARY OF THE INVENTION

In order to overcome the inherent defects of a rapidly responding electromagnetic clutch as described above, a second coil consisting of at least one turn of copper or other high current capacity material is nested with the mail coil in a cavity in the clutch magnet body. This second coil provides a current path with much higher conductivity than the iron of the magnet body and results in an increased and more effective eddy current. Diode means is connected in series circuit relationship with this second coil so that the coil will be conductive in only one direction. The generated flux of the main magnetic field, having to overcome the increased unidirectional magnetomotive opposition generated by the second coil will build or decay more slowly and clutch torque will be applied or released more gradually depending on which direction eddy current is permitted to flow. The total cross sectional area of the second coil is properly sized to yield the desired delay for any particular electromagnetic clutch design and application. Means for selectively changing the direction of permitted eddy current flow and/or in order to completely disconnect the time delay coil from the electromagnetic circuit may also be included.

It is, therefore, a primary object of this invention to provide an improved electromagnetic friction device having unidirectional means for retarding the magnetic response of the electromagnetic members upon energization or deenergization of the primary electromagnetic coil so that transmitted torque will be applied or released more gradually.

It is another object of this invention to provide a one-way time delay electromagnetic clutch or brake in which engagement or disengagement is selectively retarded.

It is still another object of this invention to provide a unidirectional time delay electromagnetic clutch having second electromagnetic coil means and diode means for retarding the magnetic response of the armature upon energization or deenergization of the primary electromagnetic coil, the second coil means being in electromagnetic flux circuit relationship with the primary electromagnetic coil.

It is still a further object of this invention to provide a unidirectional time delay electromagnetic clutch which takes advantage of the inherent characteristics of an electromagnetic coupling thereby retarding clutch engagement or disengagement by impeding the generation or collapse of the coil induced electromagnetic field whenever the primary coil is energized or deenergized.

It is yet another object of this invention to provide an electromagnetic clutch having means for slowing the electromagnetic response of the armature such that torque transmission between input and output members is gradually applied or released.

It is still another object of this invention to provide a unidirectional time delay electromagnetic clutch which eliminates excessive shock torques thereby prolonging the life of the clutch faces and the associated drive members.

It is a still further object of this invention to provide in a time delay electromagnetic clutch having second electromagnetic coil means for retarding the the magnetic response of the armature to the primary coil, control means for selecting the desired direction of eddy current flow in the second coil means so that the second coil means will be conductive and therefore retard the response of the armature either upon clutch engagement or upon clutch disengagement as desired.

It is another object of this invention to provide a unidirectional time delay electromagnetic clutch having second electromagnetic coil means and means for establishing substantially unidirectional eddy current flow therein so that the second coil means will generate magnetomotive opposition to a change in flux level developed by the primary coil only when the second coil means is conductive, thereby retarding the magnetic response of the armature in one direction only, wherein said means for establishing substantially unidirectional eddy current flow is incorporated with the second coil within the clutch magnet body.

It is another object of this invention to provide a unidirectional time delay electromagnetic clutch having second electromagnetic coil means and means for establishing substantially unidirectional eddy current flow therein so that the second coil means will generate magnetomotive opposition to a change in flux level developed by the primary coil only when the second coil means is conductive, thereby retarding the magnetic response of the armature in one direction only, wherein the means for establishing substantially unidirectional eddy current flow in the second coil means is located externally of the clutch so that permitted direction of current flow may be selected or changed externally, either by manual or automatic control.

Other objects and advantages of this invention will become apparent from the following detailed description taken in conjunction with the accompanying drawing.

DETAILED DESCRIPTION OF THE PREFERRED EMBODIMENT

Figure 1:
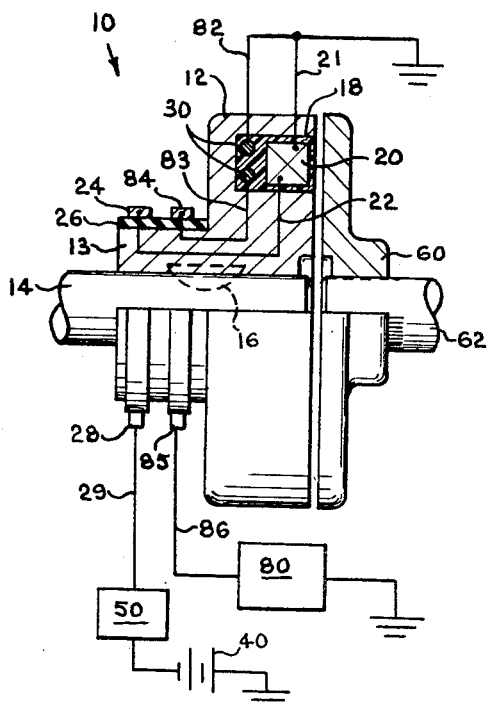
FIG. 1 shows a schematic partial cross-sectional view of the preferred embodiment of my electromagnetic clutch.

Referring to FIG. 1 of the drawing, my electromagnetic clutch is shown, generally designated by numeral 10. The clutch includes a rotatable magnet body 12 adapted to be secured to a first torque transmitting means, power shaft 14, by means of a key and key-way slot shown generally as 16. Although the preferred embodiment relates specifically to an electromagnetic clutch, it should be obvious to those skilled in the art that the teaching of my invention may be equally applied to an electromagnetic brake where the magnet body member 12 does not normally rotate; also, my invention would be equally effective in a stationary field clutch where the coil 20 and magnet body 12 are nonrotatable members. Magnet body 12 is fabricated of magnetic flux conducting material such as iron or steel. An annular recess or cavity 18 is formed within the magnet body 12 and has disposed therein the primary electromagnetic coil 20 and the separate but adjacent time delay coil 30 of my invention. Coils 20 and 30 may be secured within cavity 18 by resin or other conventional means.

Coil 20 has two leads, 21 and 22; lead 21 is connected to ground and lead 22 is connected to slip ring 24. Slip ring 24 is fixedly secured to an annular electrical insulation member 26. Member 26 is fabricated from rubber or other suitable electrical insulating material and is mounted on an axially extending shoulder 13 provided on magnet body 12. Electrical power is supplied to slip ring 24 from battery 40 through lead 29 which is connected to a brush 28. Lead 29 and power source 40 are in circuit relationship with a control circuit shown generally as the box 50, which control circuit triggers the energization and/or deenergization of the primary coil 20.

Coil 30 also has two leads, 82 and 83; lead 82 is connected to ground and lead 83 is connected to slip ring 84 which is fixedly secured to annular insulation member 26 in a manner similar to slip ring 24. Induced current developed in coil 30 is carried to control means 80 through brush 85 and lead 86.

The clutch of the present invention is reversible with respect to input and output sides and thus, clutch structure which in one installation would be an input member in another installation would be an output member. Accordingly, rotating input and output members are referred to generically as first and second torque transmitting members.

Juxtaposed and coaxially aligned with magnet body 12 is armature 60. Armature 60 is slidably splined to the terminal end of second torque transmitting means, power shaft 62. Armature 60 is adapted to move toward and away from engagement with magnet body 12 upon energization and deenergization of the electromagnetic coil 20. The axial mating faces of magnet body 12 and armature 60 are the clutch faces through which torque is transmitted. Of course, my invention can also be used in multiple disc clutches, cone clutches, etc., where the magnet body and armature are not the principal torque carrying members.

Figure 2:
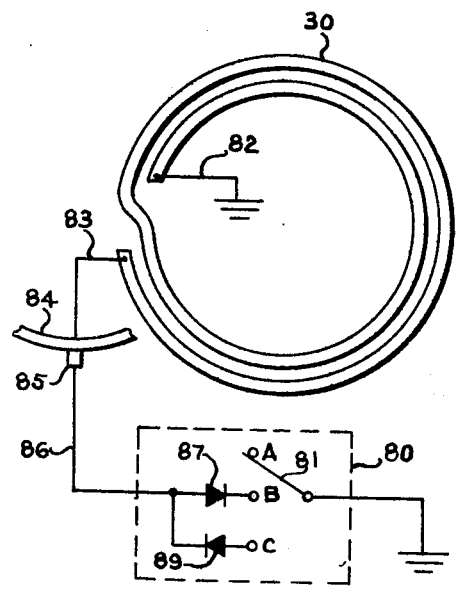
FIG. 2 is a schematic of the coil of my invention and its accompanying control means shown in FIG. 1.

Referring to FIG. 2, coil 30 is shown as a discontinuous double turn of high current capacity wire, the terminal ends of which are mounted to lead wires 82 and 83. Coil 30 is preferably fabricated from copper or other conductive material which provides a current path with much higher conductivity than the iron of magnet body 12, thus producing a larger more effective eddy current. It would be obvious to those skilled in the art that the actual configuration of coil 30 is a matter of design choice since it is the cross-sectional area of coil 30 that is determinative of the armature's response time; e.g., a solid ring of twice the cross-section will provide the same time delay effect as the two rings shown. The cross-sectional area of coil 30 and the armature response speed are directly proportional, holding the size and strength of coil 20 constant; that is, the larger the cross-sectional area of coil 30, the slower the response of the armature.

Coil 30 is shown as having substantially the same diameter of coil 20, both coils being coaxial and perpendicular to the axis of the clutch. However, it is important to recognize that the diameter and position of coil 30 relative to coil 20 is unimportant so long as an electromagnetic coupling is formed by the two coils and the coils are, therefore, in electromagnetic flux circuit relationship. For example, the time delay coil 30 would still perform its function if it were disposed around the O.D. of primary coil 20, or within its I.D., or at any other position so long as it embraced the magnetic field generated by primary coil 20.

The control means 80 which is in communication with coil 30 through lead 86 as described above, consists of a three-position switch 81, and two diodes 87 and 89 which are in parallel circuit relationship with lead 86 and two of the terminals of the switch 81. The three positions of switch 81, Position A, Position B, and Position C are as follows: position A is the open circuit position; position B connects switch 81 to the cathode of diode 87; and, position C connects switch 81 to the anode of diode 89. Switching means 81 of control circuit means 80 may be manually moved whenever it is desired to change the permitted direction of eddy current flow in coil 30 or when an open circuit is desired, or movement of switch 81 may be automatically controlled as a feedback or other function of a separate control circuit (not shown).

OPERATION OF THE PREFERRED EMBODIMENT

Switch Position A

When clutch engagement is desired, a control signal is generated from the control circuit 50 and the power is carried to coil 20 by means of the lead wires 22 and 29 and the brush and slip ring 28 and 24 thereby energizing coil 20. The change in flux linkage generated by coil 20 from zero to nominal operating level causes an electromotive force (emf), i.e. a voltage, to be induced across coil 30. Since coil 30 provides a current path with much higher conductivity than the iron of magnet body 12, a larger, more effective momentary or eddy current would normally be induced in coil 30. However, when switch 81 is in position A, an open circuit condition exists, and therefore, no eddy current can be developed in coil 30. The response of the clutch in this position is normal since coil 30 will not conduct a current either upon energization or deenergization of the primary coil 20.

Switch Position B

When clutch engagement is desired, a control signal is generated from the control circuit 50, coil 20 is energized, and a voltage is induced across coil 30 as described above. Assuming the polarity of the primary coil 20 is such that the voltage induced in coil 30 is in a clockwise direction, lead 83 will be of positive polarity and a circuit will be completed through slip ring 84, brush 85, external lead 86, diode 87, switch 81, through ground to coil lead 82. Since diode 87 represents a very low resistance path in its forward-conducting direction (from anode to cathode), a relatively large eddy current will flow through coil 30 and the above external circuit during flux build-up. The magnetomotive force created by this eddy current opposes that of the main coil current and results in slowing the rate at which magnetism rises in magnet body 12. The flux of the main magnetic field, having to overcome this increased opposition, will build more slowly thereby retarding the movement of armature 60 into engagement with magnet body 12; thus, clutch torque will be applied more gradually. Upon deenergization of primary coil 20, the voltage induced in time delay coil 30 will be opposite in polarity from that induced when coil 20 was energized. Since diode 87 is substantially conductive in one direction only, the eddy current path is now effectively blocked. Thus, no magnetomotive force is generated by coil 30 and armature 60 will respond to the deenergization of coil 20 in a normal manner. So long as the switch is in position B, the clutch will be slow to engage, but will disengage normally for every clutch engagement and disengagement cycle.

Switch Position C

When clutch engagement is desired, a control signal is generated from the control circuit 50, coil 20 is energized, and a voltage is induced across coil 30 as described above. Again, assuming that the primary coil polarity is such that the voltage induced in coil 30 is in a clockwise direction, lead 83 will be of positive polarity and a circuit will be completed through slip ring 84, brush 85, external lead 86, diode 89, switch 81, through ground to coil lead 82. However, since diode 89 is substantially conductive in one direction only, the eddy current path is effectively blocked. Thus, no magnetomotive force is generated by coil 30 and armature 60 will respond to the energization of coil 20 in a normal manner. Upon deenergization of primary coil 20, the voltage induced in time delay coil 30 will be opposite in polarity from that induced when the coil was energized. Since diode 89 represents a very low resistance path in its forward-conducting direction, a relatively large eddy current is conducted through coil 30 and the above external control circuit. The magnetomotive force created by this current reinforces that of the main coil current and results in slowing the rate at which magnetism decays in the magnet body 12. The flux of the main magnetic field, being aided by this additional magnetomotive force, will decay more slowly thereby retarding the movement of armature 60 away from engagement with magnet body 12; thus, clutch torque will be released more gradually. So long as the switch 81 is in position C, the clutch will have a normal engagement and a retarded disengagement everytime coil 20 is energized and deenergized.

DESCRIPTION OF THE ALTERNATIVE EMBODIMENT

Figure 3:
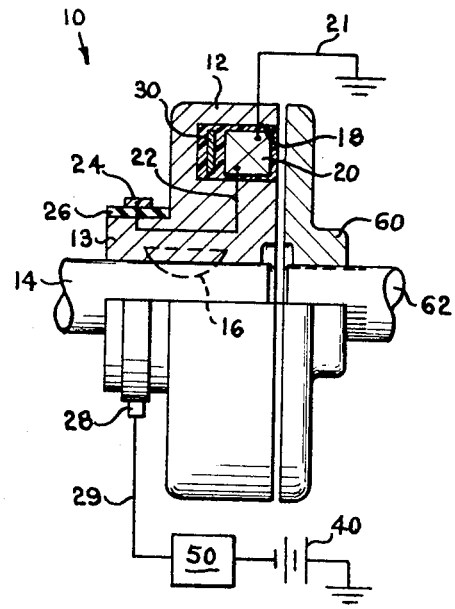
FIG. 3 is a schematic partial cross-sectional view of an alternative embodiment of my electromagnetic clutch.
Figure 4:
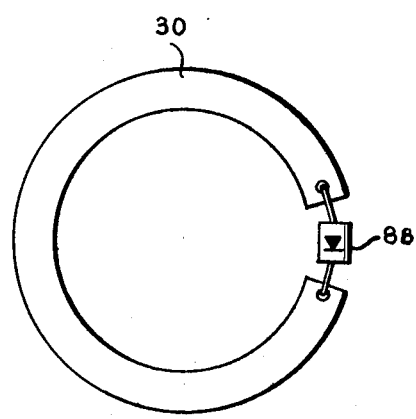
FIG. 4 shows one design of a coil in accordance with my invention that may be used in the alternative embodiment shown in FIG. 3.

Referring to FIG. 3 of the drawing, my electromagnetic clutch is shown designated by numeral 10'. Like parts of clutch 10' have the identical reference numerals of clutch 10 shown in FIG. 1. The clutch of FIG. 3 is different from that shown in FIG. 1, in that the diode means is incorporated into the time delay coil 30'. That is, the control means 80 shown in FIG. 2 has been eliminated and a diode 88 shown in FIG. 4 is connected in series circuit relationship with the time delay coil 30'. The coil 30' is shown as one discontinuous ring having diode 88 connected across its terminal ends. This unitary structure, coil 30' and diode 88, is disposed within cavity 18 of magnet body 12. Coil 30' represents a very low resistance path in its forward-conducting direction, i.e., from anode to cathode, thus, diode 88 shown in FIG. 4 will conduct current in a substantially clockwise direction. By reversing diode 88, coil 30' will conduct current in a substantially counterclockwise direction.

When clutch engagement is desired, a control signal is generated from the control circuit 50 and power is carried to coil 20 by means of the lead wires 22 and 29 and a brush and slip ring 28 and 24 thereby energizing coil 20. The change in flux linkage generated by coil 20 from zero to nominal operating level causes an electromotive force, i.e. a voltage, to be induced across coil 30'. Since coil 30' provides a current path with much higher conductivity than the iron of magnet body 12, a larger, more effective eddy current is developed in coil 30'. Assuming the polarity of primary coil 20 to be such that the voltage induced in coil 30' is in a clockwise direction, the eddy current developed in coil 30' will also follow a clockwise path, opposite in direction and parallel to the primary coil current and perpendicular to the flux linkage generated by primary coil 20. The magnetomotive force created by this eddy current opposes that of the main coil current and results in slowing the rate at which magnetism rises in magnet body 12. The flux of the main magnetic field having to overcome this increased opposition, will build more slowly thereby retarding the movement of armature 60 into engagement with the magnet body 12; thus, clutch torque will be applied more gradually. When the electrical energy supplied to coil 20 is withdrawn, the falling flux again induces a voltage across coil 30', opposite in polarity from that induced when coil 20 was energized. This induced emf would normally generate counter-clockwise eddy current flow (i.e., the same direction of flow as the primary coil current) tending to produce a magnetomotive force which would aid the main flux field and, therefore, delay its collapse. However, diode 88 is substantially conductive in the clockwise direction only and, therefore, the eddy current is blocked from flowing in the counter-clockwise direction. Thus, no magnetomotive force is generated by coil 30' and armature 60 will respond to the deenergization of coil 20 in a normal manner. Clutch 10' will, therefore, engage softly, and disengage normally everytime coil 20 is energized and deenergized.

By reversing the connection of diode 88 or by disposing coil 30' within cavity 18 180° from its position as shown in FIG. 4, current will only be permitted to flow in coil 30' upon deenergization of primary coil 20. Thus, the clutch would have a normal engagement, but a retarded disengagement based on the principles described for position C of the clutch of FIG. 1.

While only one preferred embodiment and one alternative embodiment of this invention has been disclosed, it will be apparent to those skilled in the art that changes may be made to the invention as set forth in the appended claims, and, in some cases, certain features of the invention may be used to advantage without corresponding use of other features. Accordingly, it is intended that the illustrative and descriptive materials herein be used to illustrate the principles of the invention and not to limit the scope thereof.

I claim:

1. In combination with an electromagnetic clutch of the type having a plurality of torque transmitting members, a magnet body operatively associated with at least one of said torque transmitting members, an armature operatively associated with at least one other of said torque transmitting members, said armature adapted to move toward and away from said magnet body, first electromagnetic coil means having an electrical power lead operative to generate magnetic flux attracting said armature into clutch engagement when energized and operative to release said armature from engagement when deenergized, and second coil means being in electromagnetic flux circuit relationship with said first electromagnetic coil means such that said first coil means causes an eddy current to be induced in said second coil means whenever energized and whenever deenergized, which eddy currents generate magnetomotive opposition to change in flux levels thereby retarding the magnetic response of the armature both upon engagement and upon disengagement, wherein the improvement comprises:

means for establishing substantially unidirectional eddy current flow in the second coil means said means being in circuit relationship with the second coil means such that the second coil means will generate magnetomotive opposition to any change in flux linkage thereby retarding the magnetic response of the armature in one directly only.

2. In combination with an electromagnetic clutch of the type having a plurality of torque transmitting members, a magnet body operatively associated with at least one of said torque transmitting members, an armature operatively associated with at least one other of said torque transmitting members, said armature adapted to move toward and away from said magnet body, first electromagnetic coil means having an electrical power lead operative to generate magnetic flux attracting said armature into clutch engagement when energized and operative to release said armature from engagement when deenergized, and second coil means being in electromagnetic flux circuit relationship with said first electromagnetic coil means such that said first coil means causes an eddy current to be induced in said second coil means whenever energized and whenever deenergized, which eddy currents generate magnetomotive opposition to change in flux levels thereby retarding the magnetic response of the armature both upon engagement and upon disengagement, wherein the improvement comprises:

means for permitting eddy current flow in said second coil means upon energization of said first coil means, said means preventing eddy current flow in said second coil means upon deenergization of said first coil means, thereby retarding the magnetic response of the armature whenever the clutch is energized, said means being in series circuit relationship with the second coil means.

3. In combination with an electromagnetic clutch of the type having a plurality of torque transmitting members, a magnet body operatively associated with at least one of said torque transmitting members, an armature operatively associated with at least one other of said torque transmitting members, said armature adapted to move toward and away from said magnet body, first electromagnetic coil means having an electrical power lead operative to generate magnetic flux attracting said armature into clutch engagement when energized and operative to release said armature from engagement when deenergized, and second coil means being in electromagnetic flux circuit relationship with said first electromagnetic coil means such that said first coil means causes an eddy current to be induced in said second coil means whenever energized and whenever deenergized, which eddy currents generate magnetomotive opposition to change in flux levels thereby retarding the magnetic response of the armature both upon engagement and upon disengagement, wherein the improvement comprises:

means for permitting eddy current flow in said second coil means upon deenergization of said first coil means, said means preventing eddy current flow upon energization of said first coil means, thereby retarding the magnetic response of the armature whenever the clutch is deenergized, said means being in series circuit relationship with the second coil means.

4. The combination as claimed in claim 1 wherein said means for establishing substantially unidirectional eddy current flow in the second coil means comprises diode means connected in series circuit relationship with the second coil means.

5. The combination as claimed in claim 1 including further: switching means in circuit relationship with said second coil means and said means for establishing substantial unidirectional eddy current flow having an open circuit position so that the second coil means will not conduct upon energization and deenergization of said first coil means.

6. The combination as claimed in claim 5 wherein said switching means has a second position for delaying the magnetic response of the armature upon clutch engagement by permitting an eddy current to develop in said second coil means when said first coil means is energized.

7. The combination as claimed in claim 5 wherein said switching means has a second position for delaying the magnetic response of the armature upon clutch disengagement by permitting an eddy current to develop in said second coil means when said first coil means is deenergized.

8. The combination as claimed in claim 1 including further: switching means in circuit relationship with said second coil means and said means for establishing substantially unidirectional eddy current flow having a first position for delaying the magnetic response of the armature upon clutch engagement by permitting an eddy current to develop in said second coil means when said first coil means is energized.

9. The combination as claimed in claim 8 wherein said switching means has a second position for delaying the magnetic response of the armature upon clutch disengagement by permitting an eddy current to develop in said second coil means when said first coil means is deenergized.

10. The combination as claimed in claim 1 including further: switching means in circuit relationship with said second coil means and said means for establishing substantially unidirectional eddy current flow having a second position for delaying the magnetic response of the armature upon clutch disengagement by permitting an eddy current to develop in said second coil means when said first coil means is deenergized.

11. The combination as claimed in claim 1 including further: switching means in circuit relationship with said second coil means and said means for establishing substantially unidirectional eddy current flow having an open position so that the second coil means will not conduct upon energization and deenergization of said first coil means, a second position for delaying the magnetic response of the armature upon clutch engagement by permitting an eddy current to develop in said second coil means when said first coil means is energized, and a third position for delaying the magnetic response of the armature upon clutch disengagement by permitting an eddy current to develop in said second coil means when said first coil means is deenergized.

* * * * *